(12) United States Patent
Suenaga et al.

(10) Patent No.: US 11,714,436 B2
(45) Date of Patent: Aug. 1, 2023

(54) REGULATOR

(71) Applicant: NIKKI CO., LTD., Kanagawa-ken (JP)

(72) Inventors: Naoya Suenaga, Kanagawa-ken (JP); Shutaro Aizawa, Kanagawa-ken (JP)

(73) Assignee: Nikki Co., Ltd.

( * ) Notice: Subject to any disclaimer, the term of this patent is extended or adjusted under 35 U.S.C. 154(b) by 0 days.

(21) Appl. No.: 17/697,922

(22) Filed: Mar. 17, 2022

(65) Prior Publication Data

US 2022/0300013 A1 Sep. 22, 2022

(30) Foreign Application Priority Data

Mar. 18, 2021 (JP) ................................. 2021-044834

(51) Int. Cl.
*G05D 16/10* (2006.01)

(52) U.S. Cl.
CPC .................................. *G05D 16/106* (2013.01)

(58) Field of Classification Search
CPC ................ G05D 16/106; G05D 16/103; Y10T 137/7808; Y10T 137/7811
See application file for complete search history.

(56) References Cited

U.S. PATENT DOCUMENTS

| | | | | |
|---|---|---|---|---|
| 5,950,664 A * | 9/1999 | Battaglia | ................. | F16K 39/06 137/454.6 |
| 7,036,491 B2 * | 5/2006 | Ricco | ................. | F02M 21/0242 123/527 |
| 2009/0220179 A1 * | 9/2009 | Kaneko | ................... | F16C 17/04 384/420 |
| 2016/0091097 A1 * | 3/2016 | Kawauchi | ........... | G05D 16/107 251/25 |
| 2017/0153653 A1 * | 6/2017 | Hata | ..................... | G05D 16/166 |
| 2017/0285667 A1 * | 10/2017 | Kobayashi | ........... | G05D 16/103 |
| 2018/0265697 A1 * | 9/2018 | Ainsworth | .............. | C08L 71/08 |
| 2019/0101942 A1 * | 4/2019 | Suenaga | .............. | G05D 16/103 |
| 2019/0301769 A1 * | 10/2019 | Kanematsu | ............... | F24F 7/10 |

FOREIGN PATENT DOCUMENTS

| | | |
|---|---|---|
| DE | 102016205018 A1 | 9/2016 |
| EP | 2833009 A1 | 2/2015 |
| EP | 3462272 A1 | 4/2019 |
| FR | 1093934 A * | 5/1955 |
| GB | 737198 A * | 9/1955 |
| JP | 52-92436 B2 | 9/2013 |
| JP | 2019067216 A * | 4/2019 |
| WO | 2017106666 A1 | 6/2017 |

OTHER PUBLICATIONS

English abstract for JP-52-92436.
English abstract for JP-2019-67216.
Extended European Search Report dated Jul. 25, 2022 for European Patent Application No. 22 16 0710.

* cited by examiner

*Primary Examiner* — Jessica Cahill
(74) *Attorney, Agent, or Firm* — Fishman Stewart PLLC

(57) ABSTRACT

A regulator, e.g., a pressure regulator for supplying a high pressure fuel to an engine, is disclosed. The regulator includes at least a pair of annular bearings composed of a rigid synthetic resin interposed along a length direction of a pressure regulating valve body at a predetermined distance at a position on a valve seat side in an axial direction of a gap formed between the pressure regulating valve body and an inner wall of the passage formed in a body main body.

10 Claims, 4 Drawing Sheets

REGULATOR

CROSS-REFERENCE TO RELATED APPLICATION

This application claims priority to Japanese Application No. JP 2021-044834 filed on Mar. 18, 2021, the contents of which are hereby incorporated by reference in its entirety.

TECHNICAL FIELD

The present invention relates to a regulator used to depressurize a high pressure fluid to a desired pressure.

BACKGROUND

A regulator that controls a flow rate of a high pressure fluid by opening and closing a pressure control valve via a piston portion by pressure fluctuation in the pressure regulating chamber is presented in, for example, JP S52-92436 U and JP 2019-67216 A, and for example, it is used for a pressure regulator when supplying a high pressure fuel such as CNG stored in a fuel tank to an engine.

FIG. 5 shows an example of a regulator in the related art, in which one open end of a tubular passage 2 formed to penetrate through a body main body 1 is used as an introduction port 21 of a high pressure fluid, and the other open end is used as a takeout port 22 of a decompressed fluid, a pressure regulating chamber 4 is disposed via a valve seat 3 having a valve-seat seat 31 inside the introduction port 21 in the passage 2 and composed of a valve-seat seat holding member 33 forming a through-hole in an axial direction of the passage 2, a piston pressure regulating valve 7 composed of a pressure regulating valve body 5 having a tip surface that can be in close contact with the valve-seat seat 31 between the pressure regulating chamber 4 and the takeout port 22 of the passage 2 and having a tubular communication passage with both ends open and a piston portion 6 surrounded and fixed to an outer periphery of the takeout port 22 side in the passage of the pressure regulating valve body 5 is provided so as to be slidable in the axial direction of the passage 2 and urged in a direction of the takeout port 22 in the passage 2 by a pressure regulating spring 8 that has a predetermined load and is disposed in an atmospheric chamber provided coaxially and parallel to the pressure regulating chamber 4 around the piston portion 6, a fluid adjusted to a desired pressure is taken out from the takeout port 22 by controlling a fluid pressure in the pressure regulating chamber 4 by changing opening areas of the valve-seat seat 31 and the pressure regulating valve body 5 by balancing a load by a pressure of a fluid, the fluid being a high pressure fluid introduced from the introduction port 21 being introduced into the valve-seat seat 31 through a through-hole 32 formed in the valve-seat seat holding member 33 of the pressure regulating valve body 5 and the pressure regulating chamber 4 provided so as to face the valve-seat seat 31, passing through the pressure regulating valve body 5 in which a communication passage 52 is formed, and acting on the piston portion 6 joined to the pressure regulating valve body 5, and a load by the pressure regulating spring 8 acting on the piston portion 6 on the opposite side of the pressure regulating chamber 4, and an inlet cover 23 for airtightly introducing the high pressure fluid and an outlet cover 24 for airtightly taking out the pressure-adjusted fluid are disposed at the introduction port 21 and the takeout port 22, respectively.

Further, a valve seat 3 in which the cylindrical valve-seat seat 31 is installed by fitting an outer peripheral ridge protruding from an outer peripheral end surface thereof into a fitting recess and that has a valve-seat seat holding member 33, which is a partition wall forming the through-hole 32 in the axial direction of the passage 2, is disposed inside the introduction port 21 in the passage 2, and the pressure regulating chamber 4 is formed in the direction of the introduction port 21 side of the valve-seat seat 31 of the passage 2.

Then, a piston pressure regulating valve 7 composed of a pressure regulating valve body 5 having a tip surface 51 that can be in close contact with the valve-seat seat 31 of the valve seat 3 between the pressure regulating chamber 4 and the takeout port 22 of the passage 2 and having a tubular communication passage 52 with both ends open, and a piston portion 6 having a diameter larger than that of the pressure regulating valve body 5 provided on the outer periphery on the takeout port 22 side in the passage 2 of the pressure regulating valve body 5 is slidably installed in the axial direction of the passage 2.

Furthermore, the piston portion 6 has a configuration in which the piston portion 6 is urged in the direction of the takeout port 22 of the passage 2 by the pressure regulating spring 8 having a predetermined load disposed in an atmospheric chamber 61 that is provided coaxially and parallel to the pressure regulating chamber 4 around the piston portion 6 and the fluid adjusted to a desired pressure is taken out from the takeout port 22 by controlling a fluid pressure in the pressure regulating chamber 4 by changing opening areas of the valve-seat seat 31 and the pressure regulating valve body 5 by balancing a load by a pressure of a fluid, the fluid being a high pressure fluid introduced from the introduction port 21 being introduced into the pressure regulating chamber 4 provided so as to face the valve-seat seat 31 via the through-hole 32 formed in the holding member 33 of the valve-seat seat 31 of the valve seat 3, passing through the pressure regulating valve body 5 in which a communication passage 52 is formed, and acting on the piston portion 6 fixed to the pressure regulating valve body 5, and a load by the pressure regulating spring 8 acting on the piston portion 6 on the opposite side of the pressure regulating chamber 4.

SUMMARY

However, in the regulator in the related art, friction resistance is generated at respective contact portions by sliding (reciprocating) the piston portion 6 and the pressure regulating valve body 5 of the relatively long piston pressure regulating valve 7 while tilting in clearances formed respectively between the piston portion 6 and the pressure regulating valve body 5 and the inner wall 25 of the passage 2 of the body main body 1.

Therefore, there is a problem that the sliding (reciprocating) of the piston pressure regulating valve 7 is not smooth and the performance deteriorates, in particular, there is a problem that the clearances at contact portions increase due to the friction caused by the use at the contact portions, the performance deteriorates, and the function loss develops.

The present invention has been made to solve the above problem, and an object thereof is to provide a regulator without functional loss due to an inclination of the piston pressure regulating valve by eliminating frictional resistance generated between a piston portion and a pressure regulating valve body and an inner wall of a passage formed in a body main body for holding them when a piston pressure regulating valve is slid (reciprocated).

In a regulator according to the present invention made to solve the above problem, one open end of a tubular passage formed to penetrate through a body main body is used as an introduction port of a high pressure fluid, and the other open end is used as a takeout port of a decompressed fluid, a pressure regulating chamber is disposed via a valve seat having a valve-seat seat inside the introduction port in the passage and composed of a valve-seat seat holding member forming a through-hole in an axial direction of the passage, a piston pressure regulating valve composed of a pressure regulating valve body having a tip surface that can be in close contact with the valve-seat seat between the pressure regulating chamber and the takeout port of the passage and having a tubular communication passage with both ends open and a piston portion surrounded and fixed to an outer periphery of the takeout port side in the passage of the pressure regulating valve body is provided so as to be slidable in the axial direction of the passage and urged in the direction of the takeout port in the passage by a pressure regulating spring that has a predetermined load and is disposed in an atmospheric chamber provided coaxially and parallel to the pressure regulating chamber around the piston portion, a fluid adjusted to a desired pressure is taken out from the takeout port by controlling a fluid pressure in the pressure regulating chamber by changing opening areas of the valve-seat seat and the pressure regulating valve body by balancing a load by a pressure of a fluid, the fluid being a high pressure fluid introduced from the introduction port being introduced into the valve-seat seat through a through-hole formed in the valve-seat seat holding member of the pressure regulating valve body and the pressure regulating chamber provided so as to face the valve-seat seat, passing through the pressure regulating valve body in which a communication passage is formed, and acting on the piston portion fixed to the pressure regulating valve body, and a load by the pressure regulating spring acting on the piston portion on the opposite side of the pressure regulating chamber, and at least a pair of rigid synthetic resin annular bearings are interposed at a position on a valve seat side in the axial direction of a gap formed between the pressure regulating valve body and an inner wall of the passage formed in the body main body along a length direction of the pressure regulating valve body at a predetermined distance.

Further, in the present invention, since a gap between the piston portion and the inner wall of the passage formed in the body main body is set so that the piston portion and the inner wall of the passage of the body main body do not come into contact with each other when the pressure regulating valve body is tilted along an axis within an angle range allowed by a distance between the annular bearings and a gap formed between the pressure regulating valve body and the inner wall of the passage formed in the body main body, even if the pressure regulating valve body is tilted, there is no concern that the piston portion and the body main body come into contact with each other to deteriorate or damage the performance.

Further, in the present invention, since an insertion groove for the annular bearing is formed on an end surface of a boss on the piston portion side extending from the passage of the body main body along the gap by a predetermined distance, the annular bearing can be installed at a mounting position of the pressure regulating valve body in a predetermined length direction simply by assembling the annular bearing into the insertion groove.

In addition, in a case where the annular bearing has a notch formed in a part thereof, and a flange for preventing the inserted annular bearing from being pulled out is expanded inward at an open end of the insertion groove of the annular bearing on the end surface of the boss on the piston portion side, even if the pressure regulating valve body reciprocates, the annular bearing inserted in the insertion groove does not come off.

In particular, since the annular bearing has a notch formed in a part thereof, by pressing the annular bearing inward to reduce a diameter before assembling the pressure regulating valve body, the annular bearing can be easily inserted into the insertion groove from the open end narrowed by the flange.

Furthermore, in the present invention, in a case where the insertion groove of the annular bearing is formed on the end surface of the boss on the valve seat side extending from the passage of the body main body along the gap by a predetermined distance, and a seal member for closing the gap between the pressure regulating valve body and the inner wall of the passage formed in the body main body is provided adjacent to the end surface, not only does the annular bearing inserted in the insertion groove not come off, but when the pressure is applied, the annular bearing is compressed by the seal member and fills the gap between the pressure regulating valve body and the body main body, thereby exerting a backup ring function that prevents the seal member from protruding.

According to the present invention, it is possible to provide a regulator without functional loss due to an inclination of the piston pressure regulating valve by eliminating frictional resistance generated between a piston portion and a pressure regulating valve body and an inner wall of a passage formed in a body main body for holding them when a piston pressure regulating valve is slid (reciprocated).

DETAILED DESCRIPTION

Hereinafter, an embodiment for carrying out the present invention will be described with reference to the drawings.

Figure 1:
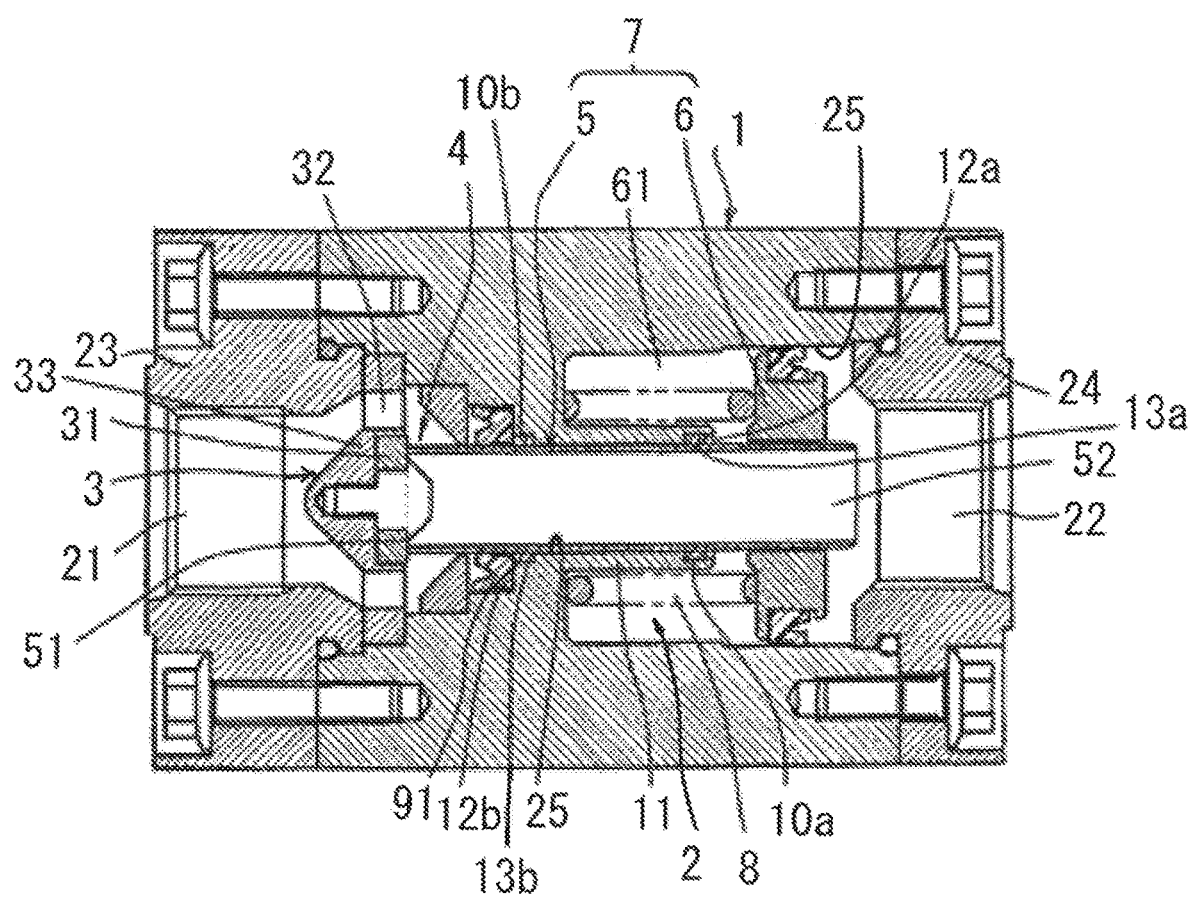
FIG. 1 is a cross-sectional view showing a valve closed according to an embodiment of the present invention.
Figure 2:
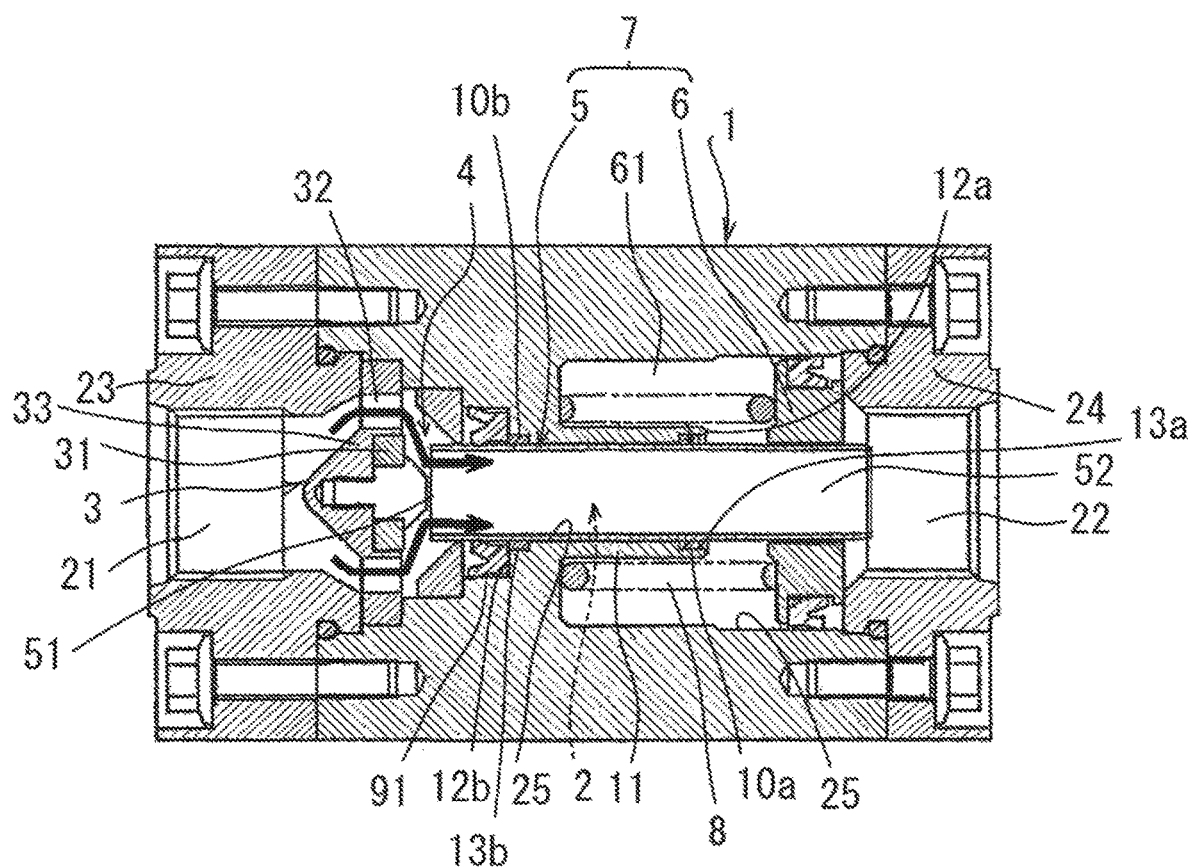
FIG. 2 is a cross-sectional view showing a valve open according to the embodiment shown in FIG. 1.
Figure 3:
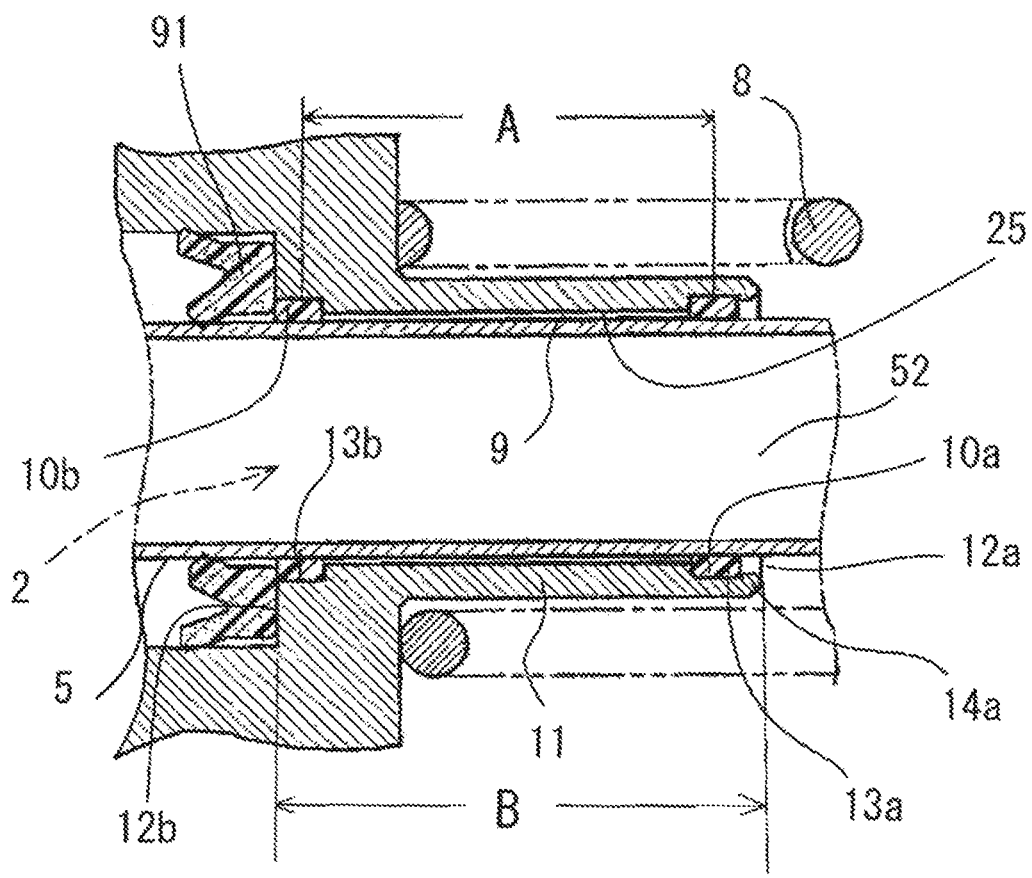
FIG. 3 is an enlarged cross-sectional view of a portion of piston pressure regulating valve according to the embodiment shown in FIG. 1.
Figure 4:
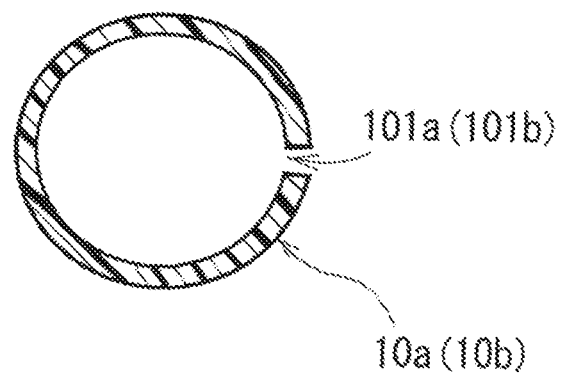
FIG. 4 is an enlarged vertical cross-sectional view showing an annular bearing according to the embodiment shown in FIG. 1.
Figure 5:
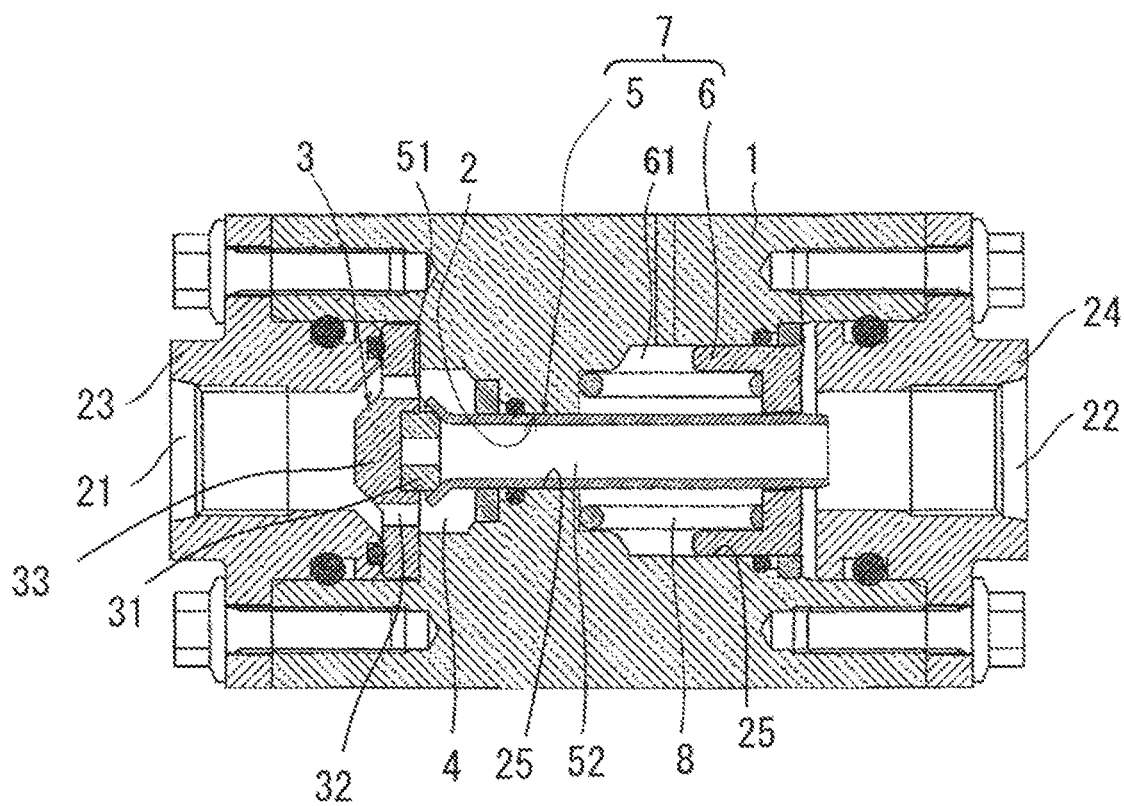
FIG. 5 is a cross-sectional view showing a valve open according to an embodiment of an example in the related art.

FIGS. 1 to 4 show cross-sectional views of a preferred embodiment of the present invention, and the overall configuration is almost the same as the example in the related art shown in FIG. 5, and therefore the detailed description of the similar parts will be omitted. Further, the same components as those in the example in the related art will be described with the same reference numerals.

Then, the embodiment according to the present invention is particularly different from the example in the related art in that, at least a pair of rigid synthetic resin annular bearings 10a and 10b that are tough and have low frictional resistance such as hard vinyl chloride resin and polypropylene resin are interposed along a length direction of the pressure regulating valve body 5 at a predetermined distance at a position on the valve seat 3 side in the axial direction of the gap 9 formed between the pressure regulating valve body 5 and the inner wall 25 of the passage 2 formed in the body main body 1.

Further, in the present embodiment, when the gap 9 between the piston portion 6 and the inner wall 25 of the passage 2 formed in the body main body is set so that the piston portion 6 and the inner wall 25 of the passage 2 of the body main body 1 do not come into contact with each other when the pressure regulating valve body 5 is tilted along the axis within the angle range allowed by the distance between the pair of annular bearings 10a and 10b (distance A shown in FIG. 3) and the gap 9.

As a result, even if the pressure regulating valve body 5 is tilted, the piston portion 6 does not come into contact with the inner wall 25 of the passage 2 of the body main body 1, so that there is no concern about performance deterioration or damage due to use.

Further, in the present embodiment, a boss 11 is extended by a predetermined distance (distance B shown in FIG. 3) from the passage 2 of the body main body 1 along the gap 9, and an annular insertion groove 13a for inserting the annular bearing 10a is formed in an end surface 12a of the boss 11 on the piston portion 6 side.

Therefore, the annular bearing 10a can be easily and surely installed at a mounting position of the pressure regulating valve body 5 in a predetermined length direction simply by inserting and assembling the annular bearing 10a into the insertion groove 13a.

In addition, in the present embodiment, since the flange 14a for preventing the inserted annular bearing 10a from being pulled out is expanded inward at the open end of the insertion groove 13a of the boss 11, even if the pressure regulating valve body 5 reciprocates in the axial direction, the annular bearing 10a inserted into the insertion groove 13a does not come off.

In particular, in the present embodiment, as shown in FIG. 4, since the annular bearing 10a has a notch 101a formed in a part thereof, the annular bearing 10a can be easily inserted into the insertion groove 13a from the open end narrowed by the flange 14a by pressing the annular bearing 10a inward from the outer peripheral surface to reduce the diameter before assembling the pressure regulating valve body 5.

Note that the annular bearing 10a according to the present embodiment in which the notch 101a is formed and the diameter thereof can be reduced as shown in FIG. 4, is preferably formed of a rigid synthetic resin having appropriate flexibility and elasticity in addition to being tough and having low frictional resistance as described above.

Furthermore, in the present embodiment, the insertion groove 13b of the annular bearing 10b is formed on the end surface 12b of the boss 11 on the valve seat 3 side extending from the passage 2 of the body main body 1 along the gap 9 by a predetermined distance, and the seal member 91 for closing the gap 9 between the pressure regulating valve body 5 and the inner wall 25 of the passage 2 formed in the body main body 1 is provided adjacent to the end surface 12b.

Therefore, not only does the seal member 91 act as a wall to prevent the annular bearing 10b inserted into the insertion groove 13b from being pulled out, but when the pressure is applied, the annular bearing 10b is compressed by the seal member 91 and fills the gap 9 between the pressure regulating valve body 5 and the body main body 1, thereby exerting a backup ring function that prevents the seal member 91 from protruding.

Since the annular bearing 10b is prevented from coming off by the seal member 91, the insertion groove 13b into which the annular bearing 10b is inserted does not have to be provided with the flange 14a as in the insertion groove 13a of the annular bearing 10a, but by providing the annular bearing 10b with a notch 101b as in the annular bearing 10a (see FIG. 4), the assembly to the pressure regulating valve body 5 can be facilitated.

What is claimed is:

1. A regulator, comprising:
   one open end of a tubular passage structured to penetrate through a body main body used as an introduction port of a high pressure fluid, and the other open end of the tubular passage used as a takeout port of a decompressed fluid,
   a pressure regulating chamber disposed via a valve seat having a valve-seat seat inside the introduction port in the tubular passage and composed of a valve-seat seat holding member forming a through-hole in an axial direction of the tubular passage,
   a piston pressure regulating valve composed of a pressure regulating valve body having a tip surface that can be in close contact with the valve-seat seat between the pressure regulating chamber and the takeout port of the tubular passage and having a tubular communication passage with both ends open and a piston portion surrounded and fixed to an outer periphery of the takeout port side in the tubular passage of the pressure regulating valve body is provided so as to be slidable in the axial direction of the tubular passage and urged in a direction of the takeout port in the tubular passage by a pressure regulating spring that has a predetermined load and is disposed in an atmospheric chamber provided coaxially and parallel to the pressure regulating chamber around the piston portion,
   a fluid adjusted to a desired pressure taken out from the takeout port by controlling a fluid pressure in the pressure regulating chamber by changing opening areas of the valve-seat seat and the pressure regulating valve body by balancing a load by a pressure of a fluid, the fluid being a high pressure fluid introduced from the introduction port being introduced into the valve-seat seat through the through-hole formed in the valve-seat seat holding member of the pressure regulating valve body and the pressure regulating chamber provided so as to face the valve-seat seat, passing through the pressure regulating valve body in which the tubular communication passage is formed, and acting on the piston portion fixed to the pressure regulating valve body, and a load by the pressure regulating spring acting on the piston portion on the opposite side of the pressure regulating chamber,
   a pair of rigid synthetic resin annular bearings interposed along a length direction of the pressure regulating valve body at a predetermined distance, at a position on a valve seat side in the axial direction of a gap formed between the pressure regulating valve body and the tubular passage formed in the body main body,
   wherein a first insertion groove of a first annular bearing of the pair of annular bearings is disposed on an end surface of a boss on the piston portion side extending from the tubular passage of the body main body along the gap by a predetermined distance,
   wherein the first annular bearing has a notch disposed in a part thereof, and a flange for preventing the inserted annular bearing from being pulled out is expanded inward at an open end of the first insertion groove of the first annular bearing,
   wherein a second insertion groove of a second annular bearing of the pair of annular bearings is disposed on an end surface of the boss on the valve seat side, and a seal member for closing the gap between the pressure regulating valve body and the tubular passage formed in the body main body is provided adjacent to the end surface on the valve seat side.

2. The regulator according to claim 1, wherein the gap between the piston portion and the tubular passage formed in the body main body is set so that the piston portion and the tubular passage of the body main body do not come into contact with each other when the pressure regulating valve body is tilted.

3. The regulator according to claim 1, wherein the pair of annular bearings are composed of vinyl chloride resin.

4. The regulator according to claim 1, wherein the pair of annular bearings are composed of polypropylene resin.

5. The regulator according to claim 1, wherein the boss is extended by a predetermined distance from the tubular passage of the body main body in the axial direction along the gap.

6. A pressure regulator for supplying high pressure fuel to an engine, comprising:
   a tubular passage having one open end structured to penetrate through a body main body provided as an introduction port of a high pressure fluid, and the other end of the tubular passage provided as a takeout port of a decompressed fluid;
   a pressure regulating chamber disposed via a valve seat having a valve-seat seat inside the introduction port in the tubular passage and composed of a valve-seat seat holding member forming a through-hole in an axial direction of the tubular passage;
   a piston pressure regulating valve composed of a pressure regulating valve body having a tip surface that can be in close contact with the valve-seat seat between the pressure regulating chamber and the takeout port of the tubular passage and having a tubular communication passage with both ends open and a piston portion surrounded and fixed to an outer periphery of the takeout port side in the tubular passage of the pressure regulating valve body is provided so as to be slidable in the axial direction of the tubular passage and urged in a direction of the takeout port in the tubular passage by a pressure regulating spring that has a predetermined load and is disposed in an atmospheric chamber provided coaxially and parallel to the pressure regulating chamber around the piston portion;
   a fluid adjusted to a desired pressure taken out from the takeout port by controlling a fluid pressure in the pressure regulating chamber by changing opening areas of the valve-seat seat and the pressure regulating valve body by balancing a load by a pressure of a fluid, the fluid being a high pressure fluid introduced from the introduction port being introduced into the valve-seat seat through the through-hole formed in the valve-seat seat holding member of the pressure regulating valve body and the pressure regulating chamber provided so as to face the valve-seat seat, passing through the pressure regulating valve body in which the tubular communication passage is formed, and acting on the piston portion fixed to the pressure regulating valve body, and a load by the pressure regulating spring acting on the piston portion on the opposite side of the pressure regulating chamber;
   a pair of rigid synthetic resin annular bearings interposed along a length direction of the pressure regulating valve body at a predetermined distance, at a position on a valve seat side in the axial direction of a gap formed between the pressure regulating valve body and the tubular passage formed in the body main body,
   wherein a first insertion groove of a first annular bearing of the pair of annular bearings is disposed on an end surface of a boss on the piston portion side extending from the tubular passage of the body main body along the gap by a predetermined distance,
   wherein the first annular bearing has a notch disposed in a part thereof, and a flange for preventing the inserted annular bearing from being pulled out is expanded inward at an open end of the first insertion groove of the first annular bearing,
   wherein a second insertion groove of a second annular bearing of the pair of annular bearings is disposed on an end surface of the boss on the valve seat side, and a seal member for closing the gap between the pressure regulating valve body and the tubular passage formed in the body main body is provided adjacent to the end surface on the valve seat side.

7. The pressure regulator according to claim 6, wherein the pair of annular bearings are composed of vinyl chloride resin.

8. The pressure regulator according to claim 6, wherein the pair of annular bearings are composed of polypropylene resin.

9. The pressure regulator according to claim 6, wherein the gap between the piston portion and the passage formed in the body main body is set so that the piston portion and the passage of the body main body do not come into contact with each other when the pressure regulating valve body is tilted.

10. The pressure regulator according to claim 6, wherein the boss is extended by a predetermined distance from the tubular passage of the body main body in the axial direction along the gap.

* * * * *